(12) United States Patent
Tarbotton et al.

(10) Patent No.: US 7,302,584 B2
(45) Date of Patent: Nov. 27, 2007

(54) MECHANISMS FOR BANNING COMPUTER PROGRAMS FROM USE

(75) Inventors: Lee Codel Lawson Tarbotton, Leicester (GB); Trevor Hugh Rice, Milton Keynes (GB); Guy William Welch Roberts, Milton Keynes (GB); Andrew John Peter Bidgood, Aylesbury (GB); Carl Steven Botterill, Walgrave (GB)

(73) Assignee: McAfee, Inc., Santa Clara, CA (US)

(*) Notice: Subject to any disclaimer, the term of this patent is extended or adjusted under 35 U.S.C. 154(b) by 1164 days.

(21) Appl. No.: 09/809,073

(22) Filed: Mar. 16, 2001

(65) Prior Publication Data

US 2002/0133710 A1 Sep. 19, 2002

(51) Int. Cl.
G06F 11/30 (2006.01)
G06F 12/14 (2006.01)
H04L 9/32 (2006.01)
G06F 17/30 (2006.01)
G06F 7/04 (2006.01)
G06K 9/00 (2006.01)
H04L 9/00 (2006.01)

(52) U.S. Cl. ...................... 713/188; 726/24
(58) Field of Classification Search .............. 713/200, 713/188, 187; 705/56; 380/30; 726/24
See application file for complete search history.

(56) References Cited

U.S. PATENT DOCUMENTS 4,757,534 A * 7/1988 Matyas et al. .............. 705/56
5,440,723 A * 8/1995 Arnold et al. .................. 714/2
5,452,442 A * 9/1995 Kephart ....................... 714/38
5,844,986 A * 12/1998 Davis ......................... 713/187
5,854,916 A * 12/1998 Nachenberg ................. 703/21
5,859,968 A * 1/1999 Brown et al. ................ 726/36
6,052,531 A * 4/2000 Waldin et al. .............. 717/170
6,216,112 B1* 4/2001 Fuller et al. .................. 705/14
6,292,012 B1* 9/2001 Yeh et al. ...................... 326/8
6,577,920 B1* 6/2003 Hypponen et al. .......... 700/200
6,694,434 B1* 2/2004 McGee et al. .............. 713/189

(Continued)

FOREIGN PATENT DOCUMENTS

WO  WO 3101037 A1 * 12/2003

OTHER PUBLICATIONS

Hedberg, Sara. "Combating computer viruses: IBM's new computer immune system", 1996.*

(Continued)

Primary Examiner—Kambiz Zand
Assistant Examiner—Michael J Simitoski
(74) Attorney, Agent, or Firm—Zilka-Kotab, PC; Christopher J. Hamaty (57) ABSTRACT

An anti-computer virus system is used to enforce the banning of computer programs. A user is provided with a tool for creating their own banned computer program identifying data. The user-created data is then used to control the anti-virus system to identify banned computer programs and take appropriate banned computer program actions. The banned computer program identifying data can be encrypted with an organization's private PGP key such that it will only be capable of successful decryption and use upon computer systems within that organization bearing the corresponding public PGP encryption key.

34 Claims, 4 Drawing Sheets

U.S. PATENT DOCUMENTS

2001/0020245 A1* 9/2001 Golds et al. .................. 709/102
2002/0116627 A1* 8/2002 Tarbotton et al. ............ 713/200
2004/0255144 A1* 12/2004 Le-Rouzo et al. ........... 713/200
2006/0053202 A1* 3/2006 Foo et al. .................... 709/206

OTHER PUBLICATIONS

Network Associates, Inc. "How PGP Works", <http://www.pgpi.org/doc/pgpintro/>.*
Simpson, Sarah. "Cryptography in Everyday Life", 1997, <http://www.eco.utexas.edu/faculty/Norman/BUS.FOR/course.mat/SSim/life.html>.*
Symantec Corporation. "Norton AntiVirus User's Guide", 2000.*
Szor, Peter. "Bad IDEA", Apr. 1998, Virus Bulletin, pp. 18-19.*
Veldman, Frans. "Heuristic Anti-Virus Technology", 1994, <http://www.madchat.org/vxdevl/papers/avers/heuris.txt>.*
Bailey, Darragh. "Re: Creating own Virus Signatures", May 2004, <http://citadelle.intrinsec.com/mailing/current/HTML/ml_focus_virus/2672.html>.*
Lavasoft. "Ad-aware", Feb. 2001, <http://web.archive.org/web/20010207040025/http://www.lavasoft.de/aaw/aaw1.html>.*
Symantec Corporation. "Norton Internet Security User's Guide", 1999.*
Wobensmith, Matt. "Why does NAV indicate a virus alert with the Flash Player?", Feb. 2000, <http://web.archive.org/web/20000229121614/http://www.macromedia.com/support/flash/ts/documents/pwsteal.htm>.*

* cited by examiner

MECHANISMS FOR BANNING COMPUTER PROGRAMS FROM USE

BACKGROUND OF THE INVENTION

1. Field of the Invention

This invention relates to the field of data processing systems. More particularly, this invention relates to mechanisms for banning from use computer programs that may be executed on data processing systems.

2. Description of the Prior Art

As computer systems and networks become larger, more complex and more critical to the operation of many businesses and institutions, there exists a need to control the computer programs that may be executed on those systems. Generally speaking, there will be a core set of computer programs that are properly intended for execution on a computer system. An individual user may add to this set further computer programs specific to their needs or requirements. There also exists a category of computer programs that it is desired to ban from use on a computer system. Examples of such programs are games and programs that can consume excessive resources, such as data streaming programs.

Whilst it is desirable to provide mechanisms that can enforce the banning of certain computer programs, it is advantageous if these mechanisms do not themselves represent a significant additional overhead in terms of installation, maintenance and consumption of processing resources. To this end, it has been proposed that banned computer programs could be treated as if they were computer viruses and the mechanisms that are already in place upon many computer systems to combat computer viruses be used to enforce the banning undesired, although not actually virus-like, computer programs. Whilst such an approach is superficially attractive as it could effectively prevent execution of unwanted computer programs without requiring an addition system and without consuming significant additional processing resources, it has the disadvantage that there is no universally accepted view of which computer programs should be banned from use. In some organizations, it may be entirely acceptable for games to be executed on computer systems, whilst in other organizations this may be strictly prohibited. Accordingly, the anti-virus computer system provider would need to produce a wide set of banned computer program definition data such that individual users could pick the appropriate definition data to ban their particular set of unwanted computer programs. This would represent an impractical additional overhead on the anti computer virus system provider as a very large number of different banned program definition files would be required. Furthermore, it is undesirable for the anti-computer virus program provider to become involved in deciding which computer programs are potentially of a sort that a user may wish to ban.

SUMMARY OF THE INVENTION

Viewed from one aspect, the present invention provides a computer program product comprising a computer program operable to control a computer to generate banned program identifying data indicative of one or more computer programs to be banned from use, said computer program comprising:

(i) user controlled program specifying logic operable to specify one or more computer programs to be banned from use; and (ii) banned program identifying data generating logic responsive to said user controlled program specifying logic to generate banned program identifying data for said one or more computer programs to be banned from use, said banned program identifying data being operable to control anti computer virus logic to identify computer programs banned from use.

The invention preserves the desirable characteristics of utilizing the anti-computer virus systems to enforce computer program banning whilst avoiding the disadvantages of requiring the system provider to produce many different banned computer program identifying data types by providing a tool to end users to themselves specify their own collection of computer programs that they wish to ban from their systems. This tool can then be used to generate banned program identifying data that interfaces with and controls an anti computer virus system to take banning measures against those computer programs specified as banned by a particular user.

It will be appreciated that the generation of anti-computer virus definition data relating to banned programs by end users could lead to misuse with malicious persons introducing definition data that treated some essential or desired computer program as banned when this was not intended. In order to help resist this, preferred embodiments of the invention are such that the tool only produces encrypted banned program identifying data using a private key. This encrypted data will only be decrypted into a form where it is usable by computer programs having a corresponding matching public key. Thus, banned computer program identifying data can be made specific to a particular organization such that will not be effective if it propagates outside of that organization. Furthermore, unless a set of banned computer program identifying data was produced using the private key corresponding to a particular machine's public key, then that definition data will not operate on the computer with the public key.

The use of an anti-computer virus mechanism for enforcing banning of computer programs has the advantage that such mechanisms already incorporate the provision for heuristic analysis. Accordingly, banned computer program identifying data can incorporate heuristic characteristics of banned computer programs such that new versions of those computer programs that are likely to show similar heuristic characteristics will also be likely to be identified as also being banned.

In a highly secure environment, the system may be utilized to produce banned computer program identifying data that effectively comprises a list of permitted computer programs with all computer not matching that list being treated as banned.

Viewed from another aspect, the present invention provides a computer program product comprising a computer program operable to control a computer to ban from use one or more computer programs, said computer program comprising:

(i) anti computer virus logic responsive to user generated banned program identifying data for said one or more computer programs to be banned from use to identify computer programs banned from use.

As well as providing the tool for generating the appropriate banned program identifying data, the invention also provides a system responsive to that data for enforcing the banning of undesired computer programs.

In order to enhance the security of the system, preferred embodiments may be arranged such that when the banned computer program identifying data is decrypted, it is stored within a secure memory region such that it is more resistant to malicious tampering.

When a banned computer program is identified, various actions may be taken. One or more of the following actions may be desired: issuing an alert message to a user or network administrator indicating identification of a banned computer program, denying access to the banned computer program, encrypting the banned computer program to render it unusable and/or deleting the banned computer program.

Preferred embodiments of the invention may also seek to protect themselves from being circumvented by a user deleting the banned computer program defining data by detecting the absence of this data and performing one or more of: issuing an alert message to the network administrator, restoring the missing data from a remote source or disabling the computer until the missing data is put back in place.

In some embodiments, the banned computer program enforcing mechanism can be implemented using the same instance of anti-virus computer software as is concurrently used for protecting the computer from computer virus threats. However, in other embodiments, it may be desirable to provide a separate concurrently running instance of such an anti-virus system that is solely responsible for the enforcement of banning of certain computer programs.

Other aspects of the invention also provide a method of generating banned program identifying data, a method of banning from use one or more computer programs, apparatus for generating banned program identifying data and apparatus for banning from use one or more computer programs.

BRIEF DESCRIPTION OF DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
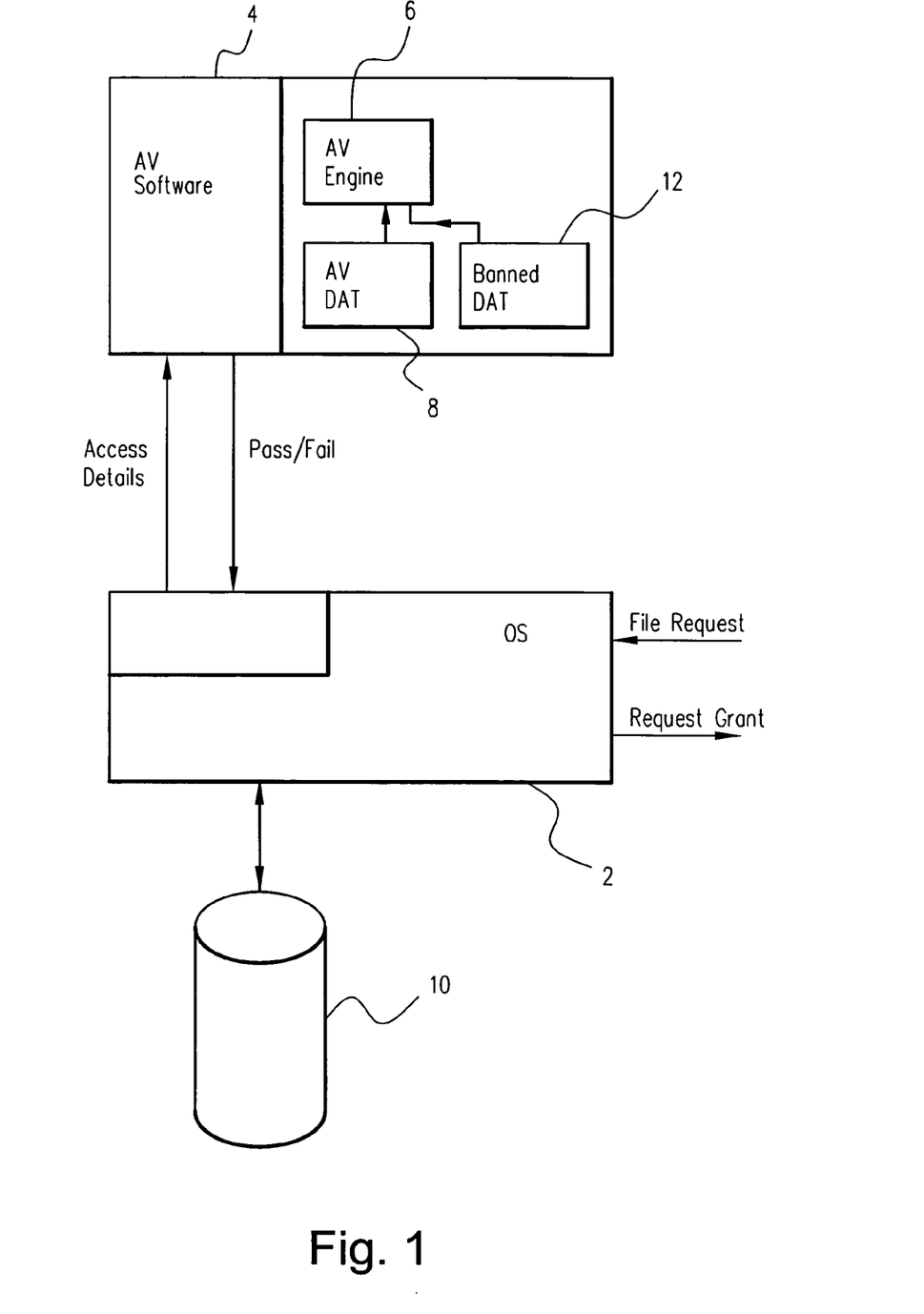
FIG. 1 schematically illustrates the relationship between an operating system and an anti-virus system.

FIG. 1 illustrates an operating system 2 that co-operates with an anti-virus system 4. In use, file access requests are received by the operating system 2 as a result, for example, of application program use or user commands. A file access request is intercepted before it is serviced by the operating system and information characterizing the file access request is passed to the anti-virus software 4. This information can include details such as the file name, the access requester, the location of the computer file requested, etc. The anti-virus software 4 uses this information to trigger an anti-virus engine 6 in conjunction with virus definition data 8 to perform an anti-virus scan of the computer file concerned. Such scans may be performed upon an on-access basis as described above or on an on-demand basis as part of regular thorough scan of an entire system. If the computer file in question passes the anti-virus scan, then a pass signal is returned to the operating system 2 which can then continue to service the file access request using, for example, a hard disk drive 10 storing the computer file.

In addition to the virus scanning operation, the anti-virus engine 6 is also responsive to banned computer program identifying data 12. This banned computer program identifying data 12 can have essentially the same form as the virus definition data 8 and can be generated using techniques similar to those that are used to produce new virus definition data as new viruses are released into the wild. However, in this instance, the banned computer program identifying data is generated by an end user themselves rather than the anti-computer virus system provider. The tools required to identify a particular computer program as being a virus or banned are relatively straightforward and suitable for provision in a generic form as compared to the more complicated and problematic tools that are needed to produce programs to repair computer virus damage and the like.

An advantage of using the anti-virus software 4 to identify banned computer programs is that these systems are set up to use identification mechanisms based upon fundamental characteristic of a computer program such that they may not be readily circumvented by merely renaming a computer program or changing insignificant portions of it. This makes anti-virus systems particularly well suited to enforcing the banning of certain computer programs.

Figure 2:
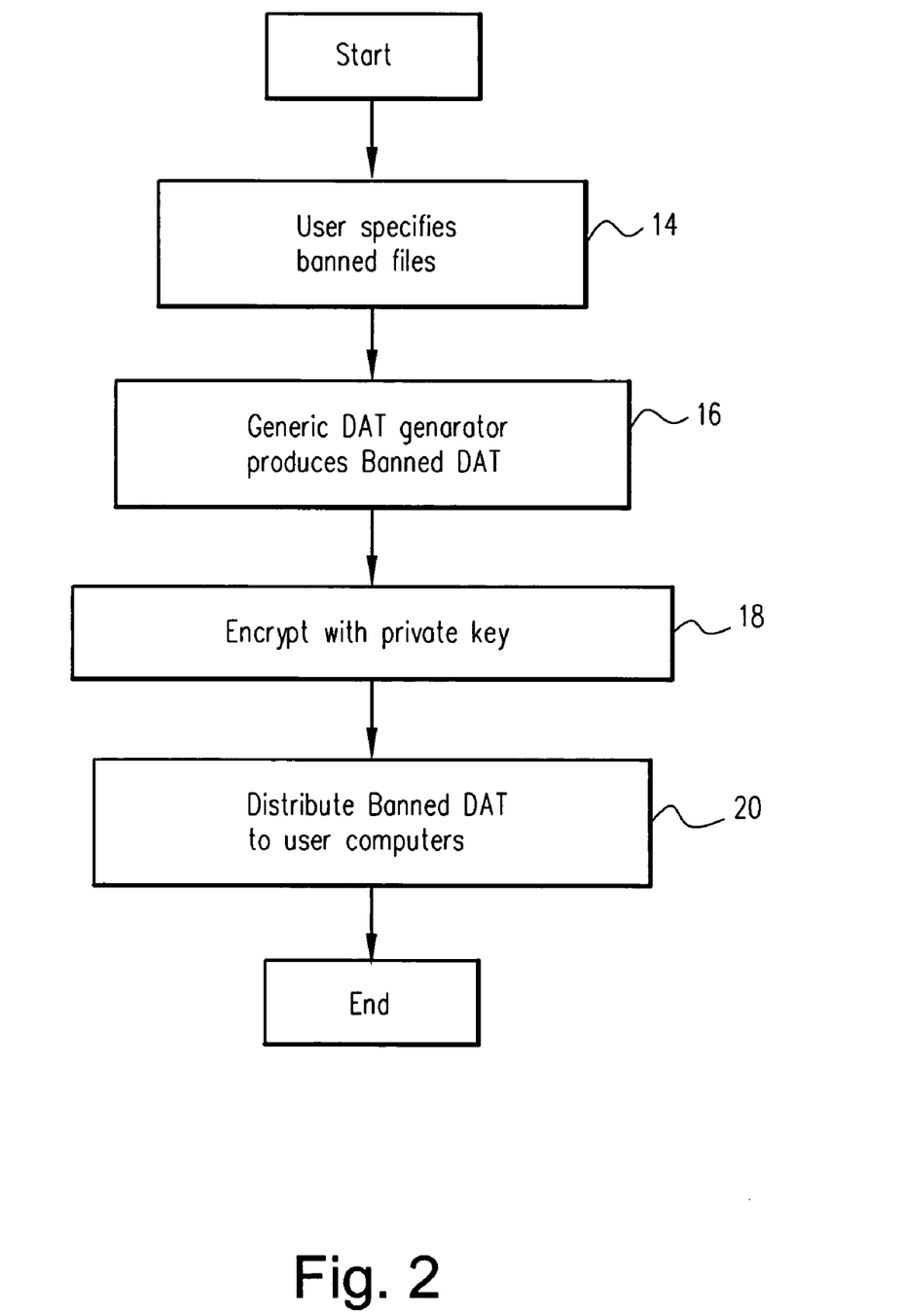
FIG. 2 is a flow diagram illustrating the operation of the tool for generating banned computer program identifying data.

FIG. 2 is a flow diagram illustrating the creation of banned computer program identifying data. At step 14, a user specifies the computer programs they wish to ban. The user may do this by collecting together within a certain directory key executable files or DLLs from an undesired computer program. It is usually readily apparent which are the key executable files and other files involved in a particular unwanted computer program. Alternatively, all the files associated with an undesired computer program could be banned.

Once the user has assembled the collection of computer files that they wish to be treated as banned, step 16 is performed to generate a set of banned computer program identifying data that may be utilized by the anti-virus software 4.

It will be appreciated that the anti-virus software 4 as illustrated in FIG. 1 may be executed as a single instance of that software or alternatively multiple instances may be executed with one only being responsive to genuine virus definition data and the other being responsive to banned computer program identifying data.

The banned computer program identifying data can look for key executable computer instruction sequences within the computer files concerned or alternatively/additionally identify heuristic behavioral characteristics of that computer program that may be analyzed in a manner that provides a degree of protection against variants of that computer program.

Once the banned computer program identifying data has been generated, the user may also associate specific actions to be triggered in response to identification of particular banned computer programs. These actions may include issuing an alert message to the user or the system administrator, denying access to the banned computer program in a manner similar to the way access is denied to a computer virus, encrypting the banned computer program rendering it unusable or possibly deleting the banned computer program. These responses may be set as a policy that is applied to all banned computer programs or alternatively may be individually tailored to each banned computer program.

In order to provide resistance against the system being used maliciously, the banned computer program identifying data is encrypted using the private PGP key of the organization generating it at step 18. Encrypting the data in this way has the result that only a computer using the corresponding public key will successfully decrypt it so rendering the widespread distribution of malicious banned computer program identifying data file less likely.

At step 20, the banned computer program identifying data file may be distributed to all of the target computers using the mechanisms that are normally employed to distribute virus definition data.

Figure 3:
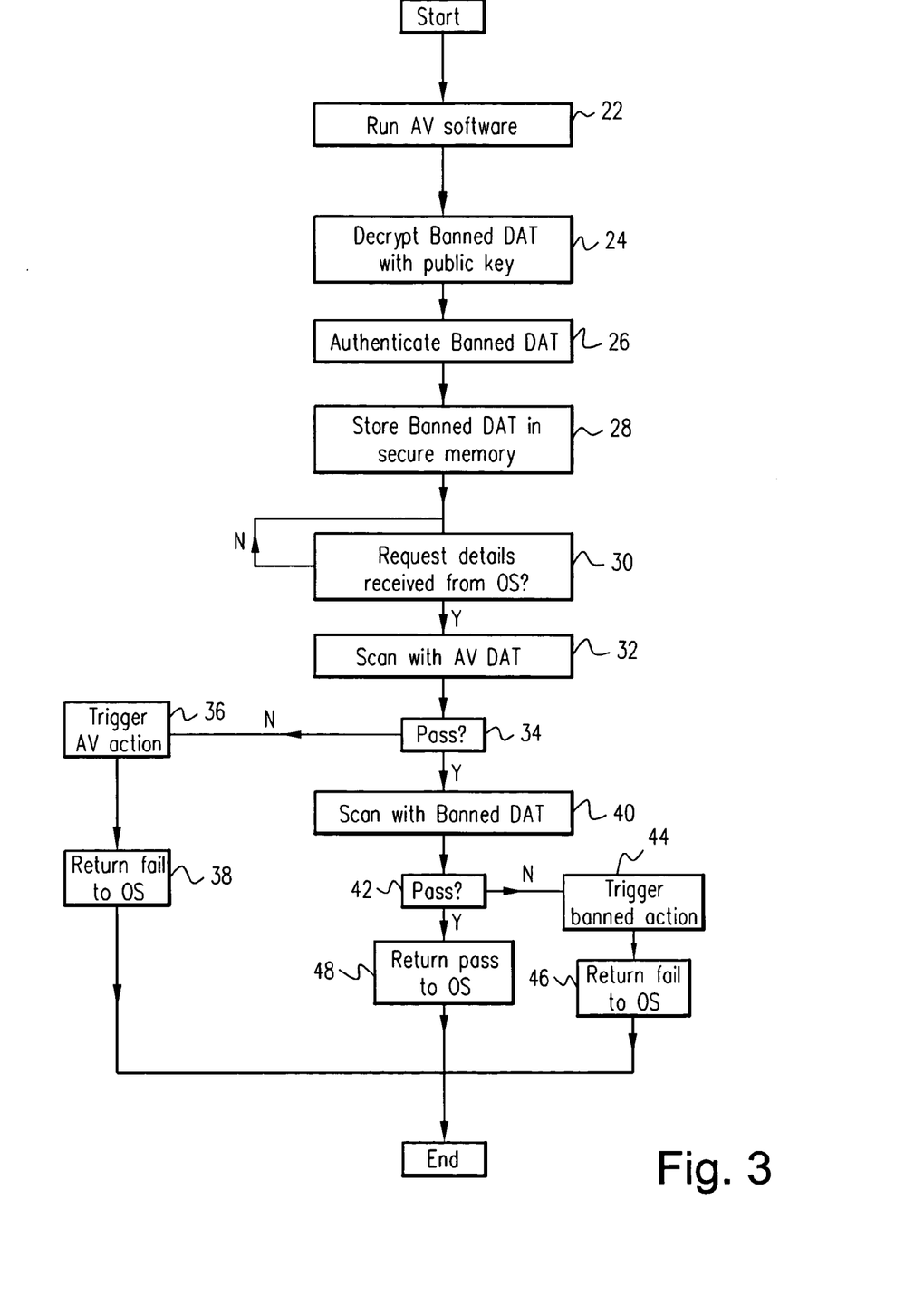
FIG. 3 is a flow diagram illustrating operation of the anti-virus computer system.

FIG. 3 is a flow diagram illustrating operation of the anti-virus software. At step 22, the anti-virus software is started. This will typically take place at boot-up in a system that is permanently running anti-virus software. At step 24, the banned computer program identifying data file is decrypted using the public PGP key stored within the computer in question. At step 26, the decrypted file is authenticated.

Although it is not illustrated, if the decrypted data file is not successfully authenticated, then it will not be used. Furthermore, if the banned computer program identifying data file is not present in a form that can be properly authenticated, then various mechanisms may be triggered in order to resist a user trying to circumvent the banning mechanisms. These triggered mechanisms include issuing an alert message to the system administrator, automatically restoring the missing data file from a remote source or possibly disabling the computer concerned until the missing file is put in place. The options to carry out these tasks can be set up by the system administrator at the time that the anti-virus system is installed and do not all need to be used.

At step 28, the properly authenticated banned computer program identifying data is stored within a secure memory area.

At step 30, the anti-virus system waits until a file access request for scanning is received from the operating system 2.

When a file access request is received, step 32 performs a normal anti-virus scan using the virus definition data 8. If the virus scan is not passed as is detected by step 34, then standard anti-virus action is triggered at step 36 and a fail response is returned to the operating system at step 38.

If the anti-virus scan is passed, then processing proceeds to step 40 at which a scan for banned computer programs is performed. This uses the banned computer program identifying data 12 and the standard anti-virus engine 6. If a banned computer program is detected at step 42, then banned actions 44, such as described above, are triggered and a fail response is returned to the operating system 2 at step 46.

If a banned computer program is not detected at step 42, then a pass response is returned to the operating system 2 by step 48.

The above is described in terms of a system that looks for specified banned computer programs. An alternative approach suitable for high security environments is one in which the user specifies a list of permitted computer programs with all other computer programs being treated as banned. The process illustrated in FIG. 2 may then be modified to produce data identifying all permitted computer files. The FIG. 3 system is then modified to check for permitted files rather than banned files. If a computer file is not positively identified as a permitted file, then it is treated as banned with a fail response being returned to the operating system when it is scanned to see if it belongs to the permitted list of files.

FIG. 3 shows the anti-virus scan taking place before the banned scan, but it will be appreciated these could be performed in the other order.

Figure 4:
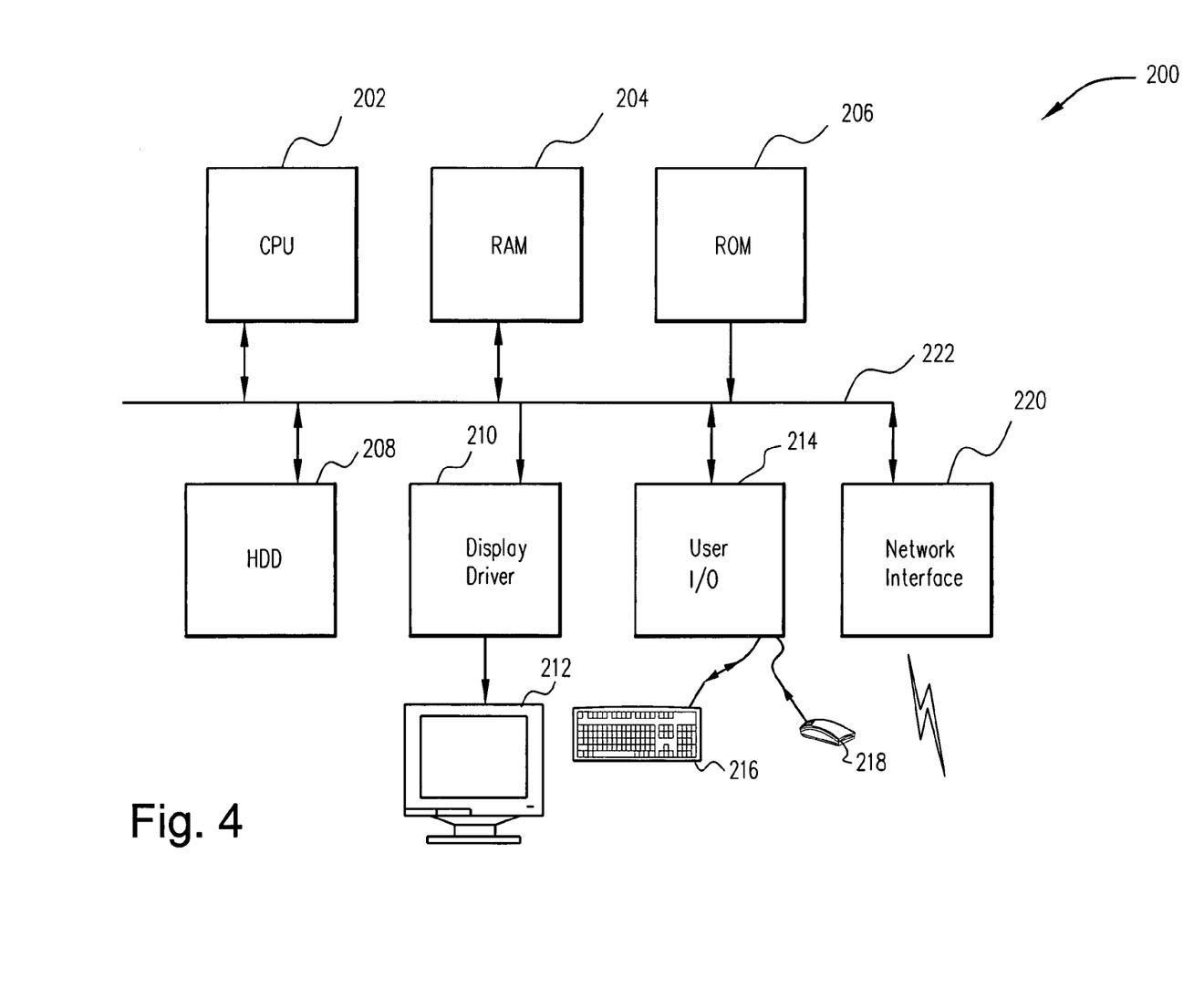
FIG. 4 is a diagram schematically illustrating a general purpose computer for forming the above-described techniques.

FIG. 4 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 4 is merely one example of a type of computer that may execute the computer program product, method and provide the apparatus described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer program operable to control a computer to generate banned program identifying data indicative of at least one computer program to be banned from use, said computer program comprising:

(i) user controlled program specifying logic operable to specify said at least one computer program to be banned from use, said at least one computer program comprising a non-virus computer program; and (ii) banned program generating logic responsive to said user controlled program specifying logic to generate banned program identifying data for said at least one computer program to be banned from use, said banned program identifying data being operable to control anti computer virus logic to identify computer programs banned from use;

wherein the anti computer virus identifies computer viruses prior to identifying the computer programs banned from use;

wherein an anti-virus scan is performed when a file access request is received, and if said anti-virus scan is not passed, an anti-virus action is triggered and a fail response is returned to an operating system, and if said anti-virus scan is passed, a scan for the computer programs banned from use is performed.

2. A computer program product as claimed in claim 1, wherein said banned program identifying data is encrypted with a private key.

3. A computer program product as claimed in claim 1, wherein said banned program identifying data controls said anti computer virus logic to identify said computer programs banned from use in a manner substantially the same as if they were one of the computer viruses.

4. A computer program product as claimed in claim 3, wherein Aid banned program identifying data includes heuristic, data identifying at least one behavioral characteristic of at least one computer program banned from use such that variants of said at least one computer program banned from use that share said behavioral characteristics may also be identified.

5. A computer program product as claimed in claim 1, wherein said banned program identifying data comprises data identifying permitted computer programs with all computer programs not matching a permitted computer program being identified as a computer program banned from use.

6. A computer program product as claimed in claim 1, wherein the at least one non-virus computer program includes at least one of a game and a data streaming program.

7. A computer program product as claimed in claim 1, wherein the at least one non-virus computer program includes games and data streaming programs.

8. A computer program product as claimed in claim 1, wherein the anti computer virus logic of a plurality of end users each includes a different selected set of computer programs banned from use.

9. A computer program product comprising a computer program operable to control a computer to ban from use at least one computer program, said at least one computer program comprising a non-virus computer program, said computer program comprising:
   anti computer virus logic responsive to user generated banned program identifying data for said at least one computer program to be banned from use to identify computer programs banned from use;
   wherein the anti computer virus identities computer viruses prior to identifying the computer programs banned from use;
   wherein said banned program identifying data is encrypted with a private key and said anti computer virus logic uses a corresponding public key to decrypt said user generated banned program identifying data prior to use;
   wherein said decrypted banned program identifying data is stored within a secured memory region once decrypted.

10. A computer program product as claimed in claim 9, wherein when a banned computer program is identified, at least one banned program action is triggered, said banned program action comprising at least one of:
   (i) issuing an alert message indicating identification of a banned computer program;
   (ii) denying access to said banned computer program;
   (iii) encrypting said banned computer program; and
   (iv) deleting said banned computer program.

11. A computer program product as claimed in claim 9, wherein said anti computer virus logic is executable as a separate instance solely to identify computer programs banned from use.

12. A computer program product as claimed in claim 9, wherein said user generated banned program identifying data comprises data identifying permitted computer programs with all computer programs not matching a permitted computer program being identified as a computer program banned from use.

13. A computer program product comprising a computer program operable to control a computer to ban from use at least one computer program said at least one computer program comprising a non-virus computer program, said computer program comprising:
   anti computer virus logic responsive to user generated banned program identifying data for said at least one computer program to be banned from use to identify computer programs banned from use;
   wherein the anti computer virus logic identities computer viruses prior to identifying the computer programs banned from use;
   wherein said anti computer virus logic responds to an absence of said user generated banned program identifying, data by performing at least one of:
   (i) issuing an alert message indicating an absence of said user generated banned program identifying data;
   (ii) restoring said user generated banned program identifying data from a remote source;
   (iii) disabling a computer upon which said anti computer virus logic is executing.

14. A method of generating banned program identifying data indicative of at least one computer program to be banned from use, said method comprising the steps of:
   user specifying at least one computer program to be banned from use, said at least one computer program comprising a non-virus computer program; and
   generating banned program identifying data for said at least one computer program to be banned from use, said banned program identifying data being operable to control anti computer virus logic to identify computer programs banned from use;
   wherein the anti computer virus logic identifies computer viruses prior to identifying the computer programs banned from use;
   wherein an anti-virus scan is performed when a file access request is received, and if said anti-virus scan is not passed, an anti-virus action is triggered and a fail response is returned to an operating system and if said anti-virus scan is passed, a scan for the computer programs banned from use is performed.

15. A method as claimed in claim 14, wherein said banned program identifying data is encrypted with a private key.

16. A method as claimed in claim 14, wherein said banned program identifying data controls said anti computer virus logic to identify said computer programs banned from use in a manner substantially the same as if they were one of the computer viruses.

17. A method as claimed in claim 16, wherein said banned program identifying data includes heuristic data identifying at least one behavioral characteristic of at least one computer program banned from use such that variants of said at least one computer program banned from use that share said behavioral characteristics may also he identified.

18. A method as claimed in claim 14, wherein said banned program identifying data comprises data identifying permitted computer programs with all computer programs not matching a permitted computer program being identified as a computer program banned from use.

19. A method for banning from use at least one computer program, said at least one computer program comprising a non-virus computer program, said method comprising the step of:
   in response to receiving user generated banned program identifying data for said at least one computer program to be banned from use, operating anti computer virus logic to identify computer programs banned from use for triggering a banned program action;
   wherein the anti computer virus logic identities computer viruses prior to identifying the computer programs banned from use;
   wherein said banned program identify data is encrypted with a private key and said anti computer virus logic uses a corresponding public key to decrypt said user generated banned program identifying data prior to use;
   wherein said decrypted banned program identifying data is stored within a secured memory region once decrypted.

20. A method as claimed in claim 19, wherein when a banned computer program is identified, said at least one banned program action is triggered, said banned program action comprising at least one of:
   (i) issuing an alert message indicating identification of a banned computer program;
   (ii) denying access to said banned computer program;
   (iii) encrypting said banned computer program; and
   (iv) deleting said banned computer program.

21. A method as claimed in claim 19, wherein said anti computer virus logic is executable as a separate instance solely to identify computer programs banned from use.

22. A method as claimed in claim 19, wherein said banned program identifying data comprises data identifying permitted computer programs with all computer programs not matching a permitted computer program being identified as a computer program banned from use.

23. A method for banning from use at least one computer program, said at least one computer program comprising a non-virus computer program, said method comprising the step of:
   in response to receiving user generated banned program identifying data for said at least one computer program to be banned from use, operating anti computer virus logic to identify computer programs banned from use for triggering a banned program action;
   wherein the anti computer virus logic identities computer viruses prior to identifying the computer programs banned from use;
   wherein said anti computer virus logic responds to an absence of said user generated banned program identifying data by performing at least one of:
   (i) issuing an alert message indicating an absence of said user generated banned program identifying data;
   (ii) restoring said user generated banned program identifying data from a remote source;
   (iii) disabling a computer upon which said anti computer virus logic is executing.

24. Apparatus for generating banned program identifying data indicative of at least one computer program to be banned from use, said apparatus comprising:
   a user controlled program specifier operable to specify at least one computer program to be banned from use, said at least one computer program comprising a non-virus computer program; and
   banned program identifying data generator responsive to said user controlled program specifier to generate banned program identifying data for said at least one computer program to be banned from use said banned program identifying data being operable to control anti computer virus logic to identify computer programs banned from use;
   wherein the anti computer virus logic identifies computer viruses prior to identifying the computer programs banned from use;
   wherein an anti-virus scan is performed when a file access request is received, and if said anti-virus scan is not passed, an anti-virus action is triggered and a fail response is returned to an operating system, and if said anti-virus scan is passed, a scan for the computer programs banned from use is performed.

25. Apparatus as claimed in claim 24, wherein said banned program identifying data is encrypted with a private key.

26. Apparatus as claimed in claim 24, wherein said banned program identifying data controls said anti computer virus logic to identify said computer programs banned from use in a manner substantially the same as if they were one of the computer viruses.

27. Apparatus as claimed in claim 26, wherein said banned program identifying data includes heuristic data identifying at least one behavioral characteristic of at least one computer program banned from use such that variants of said at least one computer program banned from use that share said behavioral characteristics may also be identified.

28. Apparatus as claimed in claim 24, wherein said banned program identifying data comprises data identifying permitted computer programs with all computer programs not matching a permitted computer program being identified as a computer program banned from use.

29. Apparatus for banning from use at least one computer program, said at least one computer program comprising a non-virus computer program, said apparatus comprising:
   an anti computer virus system responsive to user generated banned program identifying data for said at least one computer program to be banned from use to identify computer programs banned from use;
   wherein the anti computer virus system identifies computer viruses prior to identifying the computer programs banned from use;
   wherein said banned program identifying data is encrypted with a private key and said anti computer virus logic uses a corresponding public key to decrypt said user generated banned program identifying data prior to use;
   wherein said decrypted banned program identifying data is stored within a secured memory region once decrypted.

30. Apparatus as claimed in claim 29, wherein when a banned computer program is identified, at least one banned program action is triggered said banned program action comprising at least one of:
   (i) issuing an alert message indicating identification of a banned computer program;
   (ii) denying access to said banned computer program;
   (iii) encrypting said banned computer program; and
   (iv) deleting said banned computer program.

31. Apparatus as claimed in claim 29, wherein said anti computer virus system is executable as a separate instance solely to identify computer programs banned from use.

32. Apparatus as claimed in claim 29, wherein said user generated banned program identifying data comprises data identifying permitted computer programs with all computer programs not matching a permitted computer program being identified as a computer program banned from use.

33. Apparatus for banning from use at least one computer program, said at least one computer program comprising a non-virus computer program, said apparatus comprising:
- an anti computer virus system responsive to user generated banned program identifying data for said at least one computer program to be banned from use to identify computer programs banned from use;
- wherein the anti computer virus system identifies computer viruses prior to identifying the computer programs banned from use;
- wherein said anti computer virus system responds to an absence of said user generated banned program identifying data by performing at least one of:
  - (i) issuing an alert message indicating an absence of said user generated banned program identifying data;
  - (ii) restoring said user generated banned program identifying data from a remote source;
  - (iii) disabling a computer upon which said anti computer virus logic is executing.

34. A computer program product comprising a computer program operable to control a computer to generate banned program identifying data indicative of at least one computer program to be banned from use, said computer program comprising:
- user controlled program specifying logic operable to specify said at least one computer program to be banned from use, said at least one computer program comprising a non-virus computer program; and
- banned program identifying data generating logic responsive to said user controlled program specifying logic to generate banned program identifying data for said at least one computer program to be banned from use, said banned program identifying data being operable to control anti computer virus logic to identify computer programs banned from use;
- wherein an anti-virus scan is performed when a file access request is received, and if said anti-virus scan is not passed, an anti-virus action is triggered and a fail response is returned to an operating system, and if said anti-virus scan is passed, a scan for the computer programs banned from use is performed.

* * * * *

UNITED STATES PATENT AND TRADEMARK OFFICE
CERTIFICATE OF CORRECTION

PATENT NO. : 7,302,584 B2  
APPLICATION NO. : 09/809073  
DATED : November 27, 2007  
INVENTOR(S) : Tarbotton et al.

It is certified that error appears in the above-identified patent and that said Letters Patent is hereby corrected as shown below:

col. 6, line 58 insert --identifying data-- before "generating" and after "program";  
    col. 6, line 65 insert --logic-- before "identifies" and after "virus";  
    col. 7, line 16 replace "Aid" with --said--;  
    col. 7, line 47 replace "identities" with --identifies--;  
    col. 7, line 47 insert --logic-- before "identifies" and after "virus";  
    col. 8, line 20 replace "identities" with --identifies--;  
    col. 8, line 64 replace "he" with --be--;  
    col. 9, line 12 replace "identities" with --identifies--;  
    col. 9, line 48 replace "identities" with --identifies--.

Signed and Sealed this

Second Day of February, 2010

David J. Kappos  
*Director of the United States Patent and Trademark Office*